United States Patent

[11] 3,587,291

| [72] | Inventors | Edward Andrew Escallier<br>Norwalk;<br>Charles Norman Scully, Brea, Calif. |
|---|---|---|
| [21] | Appl. No. | 716,186 |
| [22] | Filed | Mar. 26, 1968 |
| [45] | Patented | June 28, 1971 |
| [73] | Assignee | North America Rockwell Corporation |

[54] PARTICLE DETECTION METHOD AND APPARATUS
3 Claims, 4 Drawing Figs.

[52] U.S. Cl. ................................................ 73/12,
73/170
[51] Int. Cl. .................................................. G01n 3/08
[50] Field of Search ........................................ 73/12, 35,
170, 432, 147; 310/2, 8, 8.3, 8.4, 8.7

[56] References Cited
UNITED STATES PATENTS

| 2,691,159 | 10/1954 | Heibel | 73/11X |
| 3,024,641 | 3/1962 | Fix | 73/35 |
| 3,159,029 | 12/1964 | Ruderman | 73/170 |
| 3,273,388 | 9/1966 | Webb | 73/147 |
| 3,304,773 | 2/1967 | Rogallo | 73/170X |
| 3,307,407 | 3/1967 | Berg et al. | 73/432 |
| 3,365,593 | 1/1968 | Roof et al. | 310/8.7 |
| 3,404,559 | 10/1968 | Lombard et al. | 73/35 |
| 3,407,304 | 10/1968 | Kinard et al. | 73/432X |

*Primary Examiner*—Charles A. Ruehl
*Attorneys*—William R. Lane, Allan Rothenberg and Ming Y. Moy ABSTRACT: A particle impact detection apparatus which includes a target formed of a dielectric or metallic material, and a sensor, formed of an electrically conductive material, connected to or disposed in close proximity to the target. Upon impact of a hypervelocity particle on the target, a voltage signal appears on the sensor. The signal varies in amplitude with the mass and velocity of the particle, and with the target materials. The apparatus, used in conjunction with a second detection apparatus, provides a means for determining both the mass and velocity of the impacting hypervelocity particle.

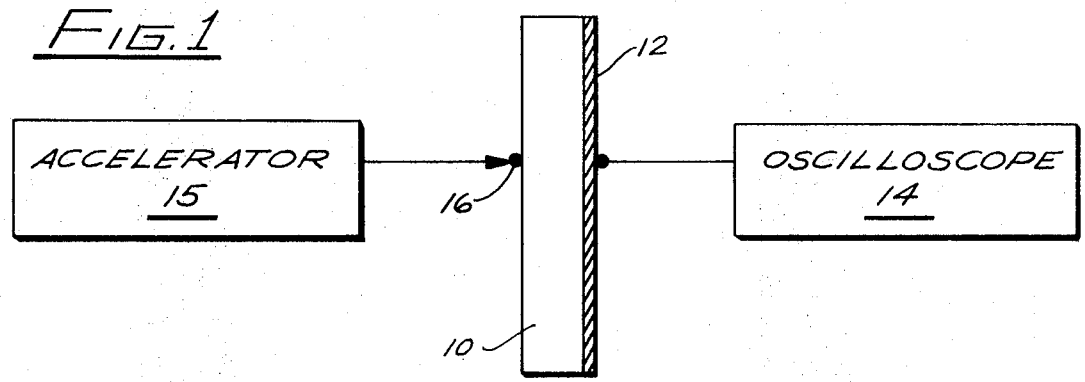
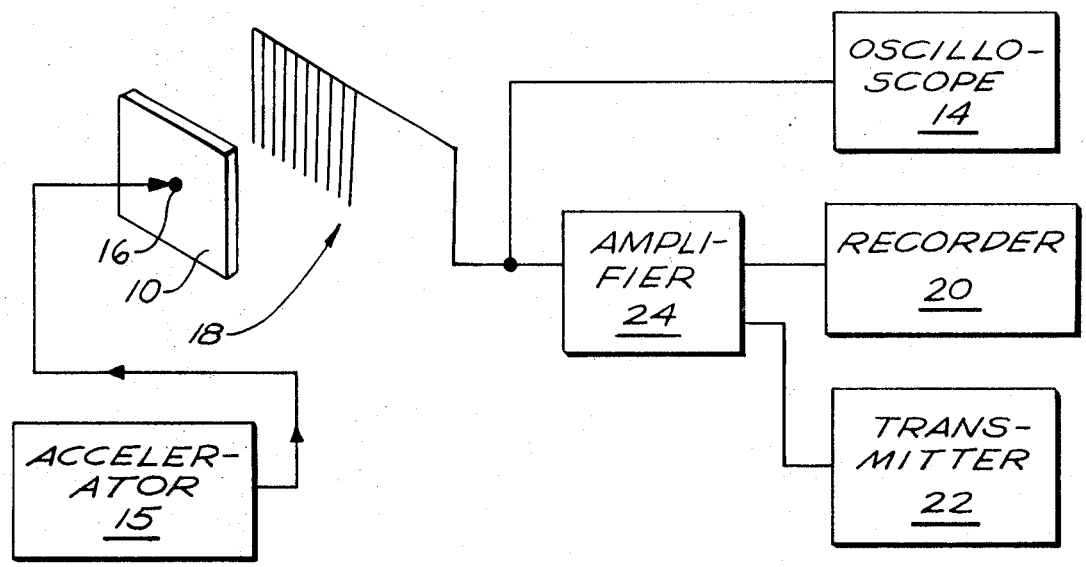
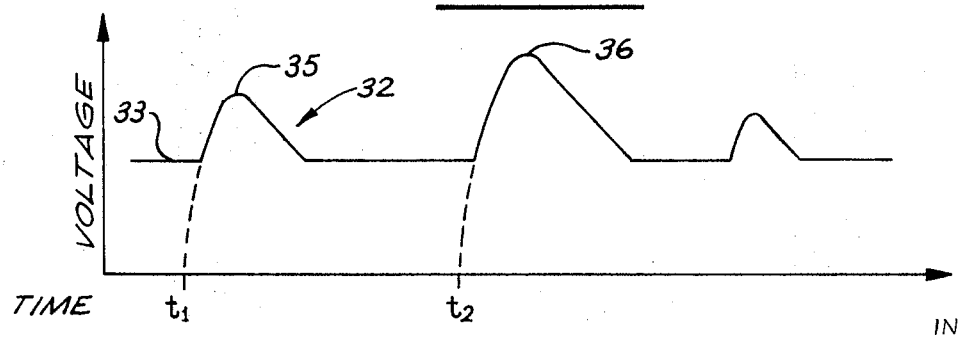

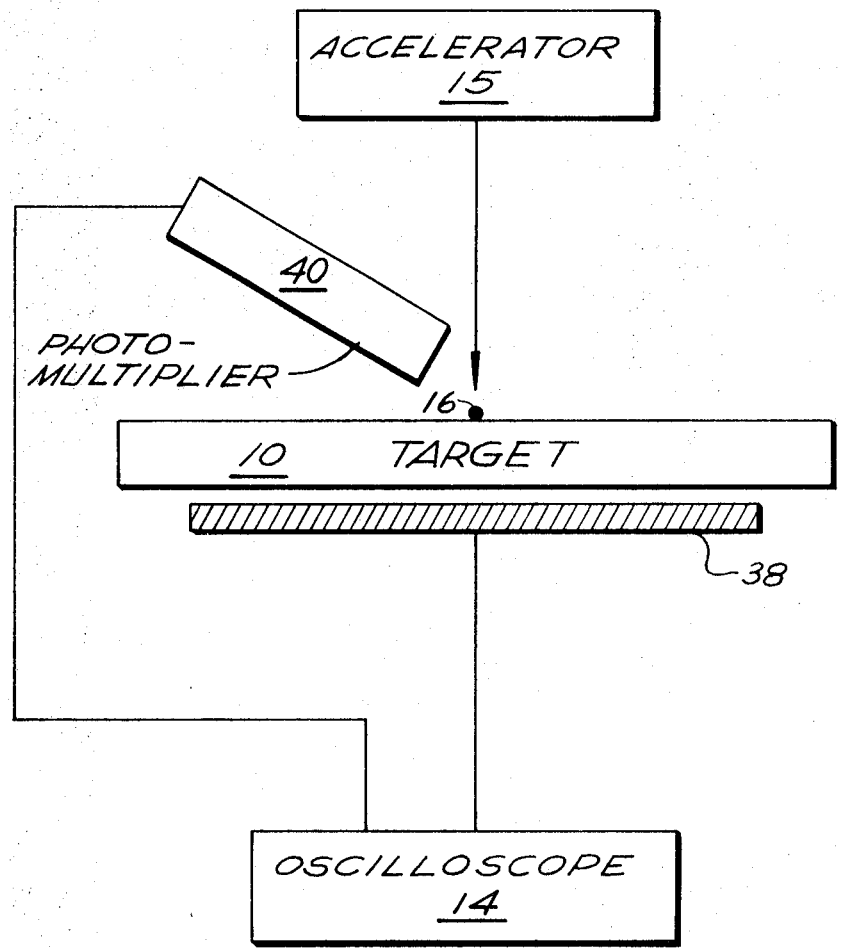

3,587,291

PARTICLE DETECTION METHOD AND APPARATUS

BACKGROUND OF THE INVENTION

This invention relates generally to particle detectors and more particularly to detection method and apparatus for indicating the frequency of incidence, mass, and velocity of the impacting particles.

In spacecraft intended for orbital or interplanetary flight, it is necessary for the shell structure to be capable of withstanding collision with space particles, such as micrometeroids, to protect the occupants and instruments carried by the spacecraft. To insure the adequacy of the shell structure, it is desirable that the design thereof be based on information indicative of the collision conditions such as frequency of incidence, mass, and velocity of space particles likely to be encountered by the spacecraft. Further, information concerning the parameters of dust particles and micrometeroids provide important conclusions as to the meteroid hazard in space travel.

Previously employed space particle impact and perforation sensors have been of many types including piezoelectric microphones which record the acoustic waves generated by impact, capacitor type detectors which record the transient arcing in the perforation hole produced in a charged capacitor, pressurized container wall, wire grids which record the loss of continuity when a wire is severed by impact, and photoelectric devices which detect sunlight appearing through the impact generated perforation in an opaque coating shielding the photocell. In general, these sensors are not self-recuperative with most sensors providing only "one shot" detection. Further, of the various types of sensors in flight operation, all require an auxiliary power supply and none give accurate and reliable information as to the mass and velocity of the impacting particle. The present invention provides a novel and improved method and apparatus for detecting mass, velocity, and frequency of incidence of the particles in space and/or in a laboratory.

SUMMARY OF THE INVENTION

In carrying out the principles of this invention according to a preferred embodiment thereof, there is provided a target for generating electrical energy signals (e.g. electromagnetic signals) upon impact of hypervelocity particles, and sensing means for sensing the signals generated. The target can be formed of a material selected from metals, semiconductors, and insulators. The sensing means in a conductive member disposed in proximity or in abutting relation to a surface of the target remote from the impact. This particle detection apparatus can also include responding means, such as an oscilloscope, a recorder, or a transmitter, for responding to energy flow variations in the sensing means resulting from the collisions between the particles and the target.

Operation of a particle detection apparatus constructed according to the principles of this invention indicates that impact of a hypervelocity particle on the target causes a voltage signal to appear on the sensing means and that the amplitude of such signal varies with the mass and velocity of the particle, and with the target material. This simple detection system has been found to be reliable and capable of recording repeated impacts over a long duration. Further, this detection system, used in conjunction with a second detection system, provides a means for determining both the mass and velocity of the impinging particles.

DRAWINGS

Other objects, advantages and features of the invention, both as to its construction and mode of operation will be readily appreciated as the same becomes better understood by reference to the following detailed description, when considered in connection with the accompanying drawings in which:

FIG. 1 is a simplified schematic representation of an embodiment of the invention;

FIG. 2 is a simplified schematic representation of a further embodiment of the invention;

FIG. 3 is a graphical representation of the electrical response produced by the particle collision detector of the invention; and FIG. 4 is a simplified schematic representation of a measurement system for determining mass, velocity, and frequency of incidence of impacting particles.

DESCRIPTION

In the study of phenomena accompanying hypervelocity impact, we have found that the impact of a hypervelocity particle on an insulative, semiconductive, or metallic target material produces electrical energy, that is, electrical and electromagnetic effects previously unsuspected. We have discovered that a number of types of probes and simple antennas respond to the impact of hypervelocity spheres on sheets of dielectric, semiconductive, or metallic materials, and that the signal strength appearing on an antenna varies with the mass and velocity of the impacting particle, and with the target materials.

Referring to the drawings wherein like reference numerals refer to like parts throughout, there is shown in FIG. 1 a particle detection apparatus including a target 10 having bonded to its rear surface, a surface remote from the impact, an electrically conductive member on sensing means 12 which is directly coupled to an oscilloscope 14. The target 10 may be of any shape and is of sufficient thickness (on the order of one-half inch, for example) to be semiinfinite for the penetration characteristics of the projectile mass and velocity range of interest. The target 10 is formed of a metal, semiconductor, or insulator. In previous operations insulators such as polyethylene terephthalate, cellulose esters, nylon, polymethyl methacrylate, polystyrene, polytetrafluorethylene, polytrifluorochlorethylene, polyvinyl chloride, phenolic resin, silicone resin, and polycarbonate resin have been preferred for the target. Further, target 10 is electrically isolated having no external power supply or other external source of potential energy connected thereto. Particle 16 is a particle encountered in space or a particle accelerated by accelerating means 15, a hypervelocity gun that is preferably of the type described in U.S. Pat. No. 3,267,720. Sensing means 12 is an electrically conductive material disposed in abutting relation to the rear surface of target 10 and suitably secured thereto, as by plating, adhesives, or the like.

In operation, upon impact of hypervelocity particle 16 on target 10, a voltage signal appears on sensing means 12. Since sensing means 12 is connected to the input of oscilloscope 14, the rise and decay of the electrical energy signal resulting from the particle impact can be observed. If a permanent record of the impact signal is desired, the screen of oscilloscope 14 may be photographed.

Another embodiment of the particle detection apparatus, illustrated in FIG. 2, includes a target 10 and an antenna system or sensing means 18 that is insulated from and situated in a close proximity to target 10 with no mechanical or electrical connections between the two elements. Upon impact of a hypervelocity particle 16 on target 10, an electromagnetic signal is radiated to the antenna system or sensing means 18 which responds with a voltage signal that is applied directly to oscilloscope 14 for observation. Further this signal is also amplified by an amplifier 24 and recorded by a recorder 20 and/or transmitted by a transmitter 22 to remote receiving stations. In as much as the voltage pulse is short lived; i.e., a few milliseconds duration, and with the exceeding rarity of simultaneous particle impingement an accurate measurement of each particle collision and the energy content thereof can be obtained.

Target 10 and accelerating means 15 of the embodiment shown in FIG. 2 are identical to the ones used in the apparatus shown in FIG. 1 as described above. Sensing means or antenna system 18 is preferably an array of parallel wires joined at one end and directly coupled to amplifier 24. Although the comb type antenna is illustrated, a variety of other configurations such as a metallic sheet, a grid, or any conductive member may also be employed.

Correlation of projectile mass and velocity with the sensed electrical signals is established emperically from study and analysis of characteristics of hypervelocity particles. For example, projectiles of different masses from 20 microns to 90 microns, and velocities from 5 km./sec. to 20 km./sec. have been fired at a target of polycarbonate resin material by a device described in U.S. Pat. No. 3,267,720. It has been found that the voltage amplitude of the pulse signal output of the antenna 18 or of sensing means 12 varies as the 0.3 power of mass of the impacting particle and as the 4th power of the velocity. This response characteristic makes the present invention valuable for the determination of particle velocities since it is considerably less sensitive to mass variations.

A graphical representation of the electrical response produced by the detection apparatus is shown in FIG. 3. A typical signal is a pulse, depending on the target material, with a rise time of up to tens of microseconds and a decay time of a few milliseconds duration. Succeeding projectile impacts occuring within this interval are merely superimposed on the proceeding signal and show the same mass and velocity function.

With particular reference to wave form 32, a portion 33 (indicating a condition prior to impact) is displaced by an amount determined by the mass and velocity of the impacting particle and the target material employed. An impinging particle (at time $t_1$) produces a voltage signal as shown by portion 35 of wave form 32. Similarly a second impinging particle (at time $t_2$) produces a signal as shown by wave form portion 36. Since the amplitude of the output voltage signals increases with the increases of the mass and velocity of the impinging particle, and varies with the target material, it is apparent that if the mass of the particle impacted at time $t_1$ is equal to the mass of the particle impacted at time $t_2$ and if the target material used at time $t_1$ is the same as the material used at time $t_2$, the velocity of the particle impacted at $t_2$ would be greater than the velocity of the particle impacted at $t_1$ as indicated by the difference in amplitude of the two pulse signals. Similarly, if the target material used and the velocities of the particles impacted at times $t_1$ and $t_2$ remained constant, the conclusion would be that the mass of the particle impacted at time $t_1$ is smaller than the mass of the particle impacted at time $t_2$.

It should be noted that the detection apparatuses shown in FIGS. 1 and 2 are passive arrangements requiring no external power supply or other external source of potential energy connected to the electrically isolated target 10. Such sensor systems are simple and reliable, and have been demonstrated to be capable of recording repeated impacts over an extended period.

The above described discovery—that an electrically conductive member responds to the impact of hypervelocity particles on a target, and that the signal strength appearing on the conductive member varies with the mass and velocity of the impacting particles, and with the target material—provides a new method of analyzing characteristics of hypervelocity particles. For example, in laboratory operations, the mass and velocity characteristics of numerous hypervelocity particles have been obtained by impacting the accelerated particle on the target to generate a shock induced electrical energy signal, by detecting the induced signal with the conductive member, and by recording and correlating the signal to indicate mass and velocity characteristics of the particle.

Since the output signal strength of the detection apparatuses shown in FIGS. 1 and 2 varies with the target materials, this newly discovered phenomenon also provides a method of identifying a material by obtaining its electrical energy response upon impact of hypervelocity particles. Electrical energy response data of various materials have been obtained in out laboratory by accelerating, with the particle accelerator 15, the particles to the desired velocity, by placing the electrically isolated target 10 on the path of the accelerated particle to cause a collision between the particle and the target 10 which is formed of a material to be tested, and by sensing, with sensing means 12 or 18, the electrical energy response data of a test specimen by following the above procedure and by correlation of this data with the laboratory reference data, one can readily identify a test specimen.

To determine the mass and velocity of each encountered particle, it is preferable to employ a measurement system which provides two or more independent measurements on the several effects produced by the impact. A measurement system having this capability is shown in FIG. 4.

This system, as shown in FIG. 4, comprises an accelerator or accelerating means 15 for accelerating particle 16 to the desired high velocities, a target 10 for generating electrical energy signals upon impact, and sensing means 38 for sensing the signals generated, all constructed and arranged in a fashion generally similar to that described in connection with the corresponding structure of FIGS. 1 and 2. Sensing means 38 is a conductive member which may be disposed in close proximity to and insulated from target 10 as shown in FIG. 4 or it may be disposed in abutting relation to the rear surface of the same target. Upon impact of hypervelocity particle 16 on target 10, a voltage signal appears on sensing means 38 and the energy flow variation in sensing means 38 is observed by using oscilloscope 14. As stated previously, the voltage signals appear on sensing means 38 varies in amplitude with the mass and velocity of the impacting particle.

In addition, the measurement system shown in FIG. 4 includes detection means for sensing a second physical phenomenon associated with the impact and for providing an output signal that is a second function of the mass and velocity of the impacting particle. This detection means includes a sensor such as photomultiplier 40 appropriately positioned to sense the optical energy produced by the impact of particle 16 on target 10. The photomultiplier 40 is well known in the art and can be, for example, Model 6199 manufactured by the Radio Corporation of America. The sensor 40 converts the sensed impact flash into electrical signals that are applied to oscilloscope 14 for recording. Employing this measurement system, it has been found that the intensity of the optical energy produced by the impact is a function of the mass and velocity of the impinging particle.

Apparatus for detecting optical energy, as shown, is well known and has been described by J. F. Friichtenicht in a National Aeronautics and Space Administration Report No. NASA CR—416 entitled "Experiments on the Impact-Light-Flash at High Velocities" dated Mar. 1966.

Since the measurement system shown in FIG. 4 includes two independent sensors 38 and 40 to make quantitative measurements on the several effects produced by the impact, by correlating the two sensor outputs, one can determine both the mass and velocity characteristics of the particle that produced the impact.

In addition to providing a new apparatus for measuring the mass and velocity of a hypervelocity particle, this invention also provides a new method of determining particle mass and velocity. In the study of phenomena accompanying hypervelocity impact, we have determined both the mass and the velocity of a hypervelocity particle by detecting a first impact induced signal that is a first function of the mass and velocity of the particle, and by detecting a second signal induced by the same impact that is a second function of the mass and velocity of the same impacting particle.

More specifically, the mass and velocity of a hypervelocity particle is determined by impacting the particle on a target as illustrated in FIG. 4, by sensing with a conductive member the electrical energy signal resulting from the collision, and by detecting, with a photomultiplier, optical energy produced by the impact. Thus, by correlating the outputs of the photomultiplier and the conductive member, one can determine both the mass and velocity of the particle produced by the impact.

Although the invention has been set forth with particularity, it should be readily apparent to those skilled in the art that modifications and variations are possible. The disclosed invention is therefore intended to cover all such changes and variations as lie within the spirit and scope of the invention and as defined in the claims appended hereto.

We claim:

1. Apparatus for determining mass and velocity of particles comprising:
    a target for producing electromagnetic waves whenever one of said particles collides with said target,
    first detection means for providing in response to a given bandwidth of said waves an output signal that is a first function of mass and velocity of said one particle; and
    second detection means for providing in response to another given bandwidth of said waves an impact output signal that is a second function of mass and velocity of said one particle.

2. The apparatus of claim 1 wherein:
    said first detection means includes a photodetection means responsive to the light energy portion of said waves, and said second detection means comprises a conductive member disposed in close proximity to and insulated from said target and responsive to the radio energy portion of said waves.

3. A method of determining mass and velocity of a hypervelocity particle comprising the steps of:
    impacting the particle upon a target whereby are formed electromagnetic waves,
    detecting with a photomultiplier said waves that are in the higher-energy, light spectrum including infrared and above,
    detecting with a radio antenna, said waves that are in the lower-energy spectrum below the infrared region,
    indicating the results of both detecting steps to provide a measure of said particle mass and velocity.